United States Patent
Peri (10) Patent No.: US 8,127,461 B1
(45) Date of Patent: Mar. 6, 2012

(54) MEASURING AND MARKING DEVICE

(76) Inventor: Oded Peri, Haydenville, MA (US)

( * ) Notice: Subject to any disclaimer, the term of this patent is extended or adjusted under 35 U.S.C. 154(b) by 0 days.

(21) Appl. No.: 13/084,640

(22) Filed: Apr. 12, 2011

Related U.S. Application Data (60) Provisional application No. 61/342,319, filed on Apr. 14, 2010.

(51) Int. Cl.
  *G01B 3/10* (2006.01)
(52) U.S. Cl. .............. 33/770; 33/760; 33/768
(58) Field of Classification Search .......... 33/770, 33/757, 759, 760, 768
See application file for complete search history.

(56) References Cited

U.S. PATENT DOCUMENTS

| | | | |
|---|---|---|---|
| 3,526,964 A * | 9/1970 | Clark, Jr. ............... 33/27.03 |
| 3,577,641 A | 5/1971 | Smith | |
| 4,603,481 A * | 8/1986 | Cohen et al. ............ 33/768 |
| 4,760,648 A | 8/1988 | Doak et al. | |
| 4,890,392 A | 1/1990 | Komura et al. | |
| 4,999,924 A * | 3/1991 | Shields ................ 33/770 |
| 5,189,801 A * | 3/1993 | Nicely ................. 33/42 |
| 5,367,785 A | 11/1994 | Benarroch | |
| 5,386,643 A | 2/1995 | Corcoran | |
| 5,671,543 A | 9/1997 | Sears | |
| 5,983,514 A | 11/1999 | Lindsey | |
| 6,223,443 B1 * | 5/2001 | Jacobs ................ 33/27.03 |
| 6,405,451 B1 | 6/2002 | Hsu | |
| 6,457,247 B1 | 10/2002 | Lin | |
| 6,497,050 B1 * | 12/2002 | Ricalde ............... 33/770 |
| 6,898,866 B2 | 5/2005 | Weeks | |
| 6,910,280 B2 | 6/2005 | Scarborough | |
| 6,928,029 B2 | 8/2005 | Rickman | |
| 6,931,734 B2 * | 8/2005 | Elder et al. ........... 33/42 |
| 6,938,354 B2 * | 9/2005 | Worthington ......... 33/668 |
| 6,971,185 B2 | 12/2005 | Scarborough | |
| 6,996,915 B2 * | 2/2006 | Ricalde ............... 33/770 |
| 7,040,035 B1 | 5/2006 | Scarborough | |
| 7,065,895 B2 | 6/2006 | Hoopengarner | |
| 7,086,174 B2 | 8/2006 | Scarborough | |
| 7,159,332 B2 * | 1/2007 | Sullivan .............. 33/770 |
| 7,162,805 B2 | 1/2007 | Vick | |
| 7,222,437 B2 | 5/2007 | Spanski et al. | |
| 7,228,644 B1 | 6/2007 | Hellem et al. | |
| 7,260,899 B2 | 8/2007 | Jones | |
| 7,263,785 B2 * | 9/2007 | Sullivan .............. 33/768 |
| 7,334,344 B2 | 2/2008 | Scarborough | |
| 7,363,723 B1 | 4/2008 | Peterson | |
| 7,900,370 B1 * | 3/2011 | Treige ............... 33/770 |
| 2002/0153734 A1 | 10/2002 | Schroeder | |
| 2003/0154617 A1 * | 8/2003 | Ricalde .............. 33/770 |
| 2004/0025364 A1 * | 2/2004 | Elder et al. .......... 33/770 |
| 2008/0072446 A1 | 3/2008 | Hu | |
| 2008/0086903 A1 | 4/2008 | Peterson | |

\* cited by examiner

*Primary Examiner* — Yaritza Guadalupe-McCall
(74) *Attorney, Agent, or Firm* — Deborah A. Basile; Karen K. Chadwell; Doherty, Wallace, Pillsbury & Murphy, P.C.

(57) ABSTRACT

A measuring and marking device used as an attachment to, or as an integral part of, a standard tape measure. The device comprises a specially configured stop member, indicator member, and scribe member, which operate together to provide for a precise take, read, transfer, recordation, and replication of a measurement.

10 Claims, 9 Drawing Sheets

MEASURING AND MARKING DEVICE

CROSS REFERENCE TO RELATED APPLICATIONS

This application claims the benefit of U.S. Provisional Application No. 61/342,319 filed on Apr. 14, 2010.

BACKGROUND TO THE INVENTION

1. Field of the Invention

The present invention relates to measuring devices, and more particularly, to a device for measuring, reading, transferring, and marking a measurement to be marked on a piece of work or material.

2. Background of the Invention

Precision and efficiency are common problems in reading, recording, transferring and marking of measurements. Standard "pocket" or handheld tape measures do not provide highly accurate sighting of the dimensions measured, do not retain the accurate measurement for transfer to another location or material piece of work, and do not include a tool to accurately scribe or mark the measurement immediately after transfer.

SUMMARY OF THE INVENTION

The above-mentioned problems of the prior art are overcome or eliminated by a measuring and marking device for use in the precise taking, reading, replicating, and marking of a measurement with a tape measure, wherein the device comprises: a lower bracket positioned substantially perpendicular to a lateral bracket, wherein the lateral bracket comprises a front side opposite to a back side; a horizontally extending indicator member comprising a front side opposite to a back side, wherein the indicator member extends from the back side of the lateral bracket; a stop member comprising a bar having a front side opposite to a back side, wherein the bar horizontally extends from the back side of the lateral bracket and terminates at an anterior end; and a scribe member comprising a wall which is coaxial with the anterior end of the bar and which terminates at a point, wherein the point extends below the lower bracket; wherein the front side of the indicator member, the front side of the bar, and the point of the scribe member are coplanar, and further wherein an aperture is formed between the indicator member, the stop member, and the scribe member such that when the device is positioned on the tape measure, a tape blade aperture of the tape measure is aligned with the aperture, the front side of the indicator member overlies and is aligned with measuring indicia located on a tape blade of the tape measure when the tape blade is extended away from a housing of the tape measure, and the lower bracket abuts a bottom wall of the tape measure.

In another exemplary embodiment, the measuring and marking device comprises a frame comprising: a stop member comprising a horizontally extending bar having a front side opposite to a bottom side; a scribe member comprising a front wall which centrally extends from the front side of the bar, and which terminates at a point oppositely situated from the bar; an anterior flange oppositely situated from a posterior flange, wherein each of the anterior and posterior flanges vertically extend from the front side of the bar; and a first indicator member which extends from the anterior lateral flange and a second indicator member which extends from the posterior lateral flange, wherein each of the first and second indicator members slope downwardly from the respective anterior and posterior lateral flanges and towards each other to each terminate at a respective tip, each tip having a front side opposite to a back side; wherein the front side of the bar, the front sides of the tips of the first and second indicator members, and the point of the scribe member are coplanar; and further wherein, when the device is positioned on the tape measure, the tips of the first and second indicator members overly and are aligned with measuring indicia on a tape blade of the tape measure when the tape blade is extended from a housing of the tape measure.

The small size of the device allows a user to readily hold and manipulate the tape measure. A user can take accurate measurements in positions of poor visibility and awkward accessibility. A user can set precise measurements taken from other media or instructions, and lock such precise measurements in place on the tape measure. A user can easily transfer and mark such measurements onto another piece of work, and/or duplicate multiple pieces of work.

The present invention, when used, e.g., as an attachment to or part of a standard pocket tape measure, eliminates the problems of inaccurate human eyesight and memory, and eliminates the need to manipulate a separate marking tool, pen or pencil for recording, transferring and marking precise measurements. It solves the problems of poor accuracy, inefficiency, wasted time and material. The present measuring and marking device further facilitates precise measurement taking and reading for those persons who otherwise cannot read numbers readily, such as those suffering from dyslexia, weak eyesight, poor motor skills, etc.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be made to the accompanying drawings and descriptive matter in which there are illustrated preferred, but not exclusive, embodiments of the invention.

DETAILED DESCRIPTION OF THE INVENTION

The measuring and marking device of the present invention comprises a stop member, an indicator member, and a scribe member, wherein each of the stop member, the indicator member and the scribe member are configured and positioned relative to one another to provide a reliable way of measuring, tracking, and replicating a measurement. More particularly, the stop member provides a means whereby a tape blade of a tape measure, may be stabilized temporarily without the necessity of implementing a locking mechanism such as is typically found in conventional tape measures; the indicator member facilitates a precise reading of the tape blade's measuring indicia; and the scribe member allows for the precise marking of an object so that a particular measurement may be replicated.

The measuring and marking device of the present invention may be manufactured as part of, or easily attached to, any standard tape measure including, for example, a standard size/shape of "pocket" or hand-held tape measure, thereby, enhancing normal usage and function of the tape measure. The measuring and marking device adds to any such functional tape measure the elements necessary for quick and precise measuring, reading, recording, transferring and marking of measurements. The stop member, indicator member, and scribe member of the measuring and marking device may be assembled during the manufacturing process to form a single, integral piece, and the measuring and marking device is preferably designed so that it may be built-in or readily attached to any suitable tape measure, thereby forming a simple, convenient and unitary tool.

Once the measuring and marking device is manufactured with and/or fastened to any suitable tape measure, the resulting tape measure may be used in the normal fashion, such as, by securing a tab of the tape blade at one end of an object to be measured, and extending the tape blade across the object to a stop point on the object. Should the stop point be, for example, an edge of the object, the stop member of the measuring and marking device may be positioned such that it physically abuts the edge and thereby temporarily secures the tape measure to the object. The indicator member above the tape blade indicates the precise measurement from the tab of the tape measure to the stop member. Having obtained this measurement, a user may accurately replicate such first measurement by extending the tape blade until the indicator member is aligned with the measuring indicia on the tape blade that is equal to the measurement. Such measurement may be locked in position by using the locking mechanism.

Additionally, the measuring and marking device may be used to mark or score an object at a particular measurement point. Once the desired measurement has been located on the tape measure using the indicator member, such as described above, for example, the scribe member may be used to precisely mark and score the object at a desired position on the object by applying pressure while swinging the tape measure from side to side against the surface to be marked. The scribe member may comprise anything from a ridge, ledge, rim, knob, protrusion(s), lip, overhang, etc. Nevertheless, in an exemplary embodiment, the scribe member comprises a portion being generally pointed, wherein such pointed dimension permits indentation of a mark onto a surface. However, other shapes are also envisioned.

In order to ensure precise the precise read, recordation, replication, and marking of a measurement, certain key portions of the stop member, the indicator member, and the scribe member are coplanar with one another, wherein such key portions will become apparent after a reading of the present disclosure.

There has thus been outlined, rather broadly, the more important features of the invention in order that the detailed description thereof that follows may be better understood, and in order that the present contribution to the art may be better appreciated. Any additional features of the invention will be described hereinafter and may form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. Rather, the invention is capable of other embodiments and of being practiced and carried out in various ways. Also, it is to be understood that the phraseology and terminology employed herein are for the purpose of description and should not be regarded as limiting.

Referring to FIGS. 1-8, an exemplary tape measure assembly 10 comprises an exemplary measuring and marking device 100 attached to a tape measure 12. Tape measure 12 comprises a housing 13 which holds a locking mechanism 14 and a wound tape blade 16 having measuring indicia thereon, wherein tape blade 16 has a tab 17 disposed on a terminal edge 19 thereof, wherein tab 17 is configured to hook onto the edge of a measured surface, such as the edge of a board. Although housing 13 is depicted as an elongated square, many different shapes and styles of tape measure housings are known in the prior art and may be configured for use with the present invention. Nevertheless, exemplary housing 13 has opposed side walls 22, 24, a top wall 26, a bottom wall or base 28, a rear wall 30, and a front wall 32, wherein these walls define an enclosure for holding wound tape blade 16. Front wall 32 has a tape blade aperture 34 therethrough which allows for a passageway for the extension and retraction of tape blade 16.

Tape blade 16 may be an elongated blade formed of a ribbon of metal or composite material coiled on a spooling means, such as a spool, with a retraction means, such as a spring mechanism. Such types of coiled blade with spring tape measures are common in the prior art.

Locking mechanism 14 comprises a means for locking tape blade 16 in position. To that end, locking mechanism 14 comprises a button section 21 that protrudes past an exterior side 23 of housing 13. Such means for locking tape blades of tape measures are known in the prior art. Additionally, locking mechanism 140 is completely optional, in that the present invention, unlike many of the prior art devices, will work absent such a means for locking.

Still referring to FIGS. 1-8, with particular emphasis on FIGS. 1-4, measuring and marking device 100 comprises a frame 102 disposed substantially perpendicular to a mounting plate 104. Frame 102 is attached to mounting plate 104 via shoulder member 106 and 107, wherein a space 108 is formed between shoulder members 106 and 107.

Frame 102 comprises a stop member 121 wherein stop member 121 comprises a horizontally extending bar 122. Bar 122 has an anterior end 136 opposite to a posterior end 138, and a front side 152 opposite to a back side 154.

Frame 102 further comprises an anterior lateral flange 114 oppositely situated from a posterior lateral flange 116. Anterior lateral flange 114 vertically extends at a generally perpendicular angle from anterior end 136; while posterior lateral flange 116 vertically extends at a generally perpendicular angle from posterior end 138. Each of flanges 114 and 116 terminate at a respective top end 118 and 120.

Frame 102 further comprises indicator members 124 and 126, which extend from respective top ends 118 and 120, and slope downwardly and inwardly towards each other where they terminate at a respective tip 132 and 134. Tips 132 and 134 are configured such that, when device 100 is applied to tape measure 12 and tape blade 16 is extended through tape blade aperture 34, tips 132 and 134 overly and are aligned with the measuring indicia of tape blade 16. Tips 132 and 134 comprise a front side 115 opposite to a back side 117, wherein front sides 115 of tips 132 and 134 are coplanar with front side 152 of bar 122 of stop member 121.

Frame 102 further comprises a scribe member 140. Scribe member 140 centrally extends from bar 122 and is directed towards and extends past mounting plate 104. Scribe member 140 comprises a substantially triangular shaped front side 142 having a base 144 centrally disposed on front side 153 of bar 122 and an apex 146 extending towards and past mounting plate 104. Scribe member 140 further comprises a wall 148 which is directed towards mounting plate 104 and which is connected to apex 146 at an acute angle, such that a marking point 149 is created at the interface between apex 146 and wall 148. Marking point 149 is coplanar with front sides 115 of tips 132 and 134 and with front side 152 of bar 122.

Frame 102 further comprises an aperture 130 formed therethrough and which is bordered by bar 122, flanges 114 and 116, and indicator members 124 and 126.

When attached to housing 13 of tape measure 12, a back side 150 of measuring and marking device 100 abuts front wall 32, and a top side 105 of mounting plate 104 abuts bottom wall 28 such that aperture 130 is aligned with tape blade aperture 34 of housing 13. In an exemplary embodiment, a double-sided adhesive may be disposed on top side 105 of mounting plate 104 to further ensure adhesion of device 100 to housing 13. Additionally or alternatively, other fastening and/or securing means may be used to adhere device 100 to housing 13, including, e.g., screws, nails, and the like. Alternatively, device 100 may be integrally formed with tape measure 10 during the manufacturing process.

When properly assembled to tape measure 10, frame 102 rests against front wall 32, a top side 105 of mounting frame 104 rests against bottom wall 38, aperture 130 is aligned with tape blade aperture 34, and front side 115 of tips 132 and 134 overly and are aligned with measuring indicia located on tape blade 16 when tape blade 16 is extended from housing 13 and through apertures 34 and 130.

In an exemplary application of assembly 100, an object is measured by placing tab 17 against an edge of the object. Tape blade 16 is extended from housing 13 until front side 152 of bar 122 of stop member 121 abuts another edge of the object. Tips 132 and 134 of respective indicator members 124 and 126 facilitate reading of the measurement as front sides 115 of tips 132 and 134 are in direct alignment with the resulting measurement indicia.

Replication of the resulting measurement may be achieved by extending tape blade 16 to the previously measured length by aligning front sides 115 of tips 132 and 134 with the previously determined measuring indicia. Such extended tape blade 16 may be positioned on the object and marking point 149 may be disposed against the object. Housing 13 may then be moved in a side to side fashion such that marking point 149 marks and/or scores the object. As marking point 149, front side 115 of tips 132 and 134, and front sides 152 of bar 122 are coplanar, the replication of the measurement is as exact and precise as possible.

Figure 1:
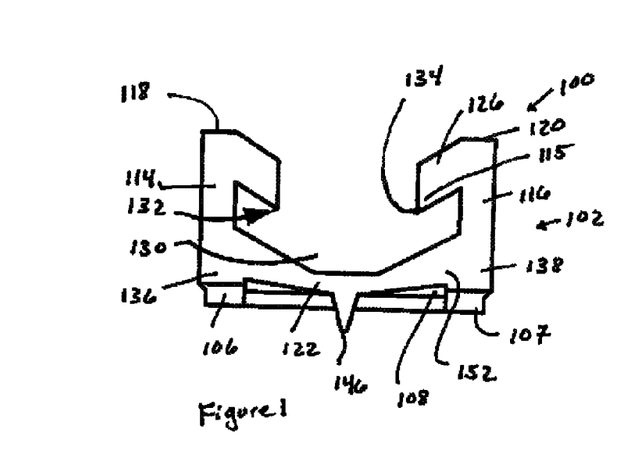
FIGS. 1-4 are schematics depicting various perspectives of an exemplary measuring and marking device.
Figure 2:
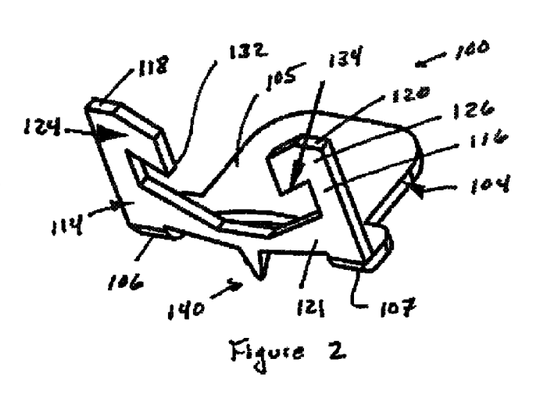
Figure 3:
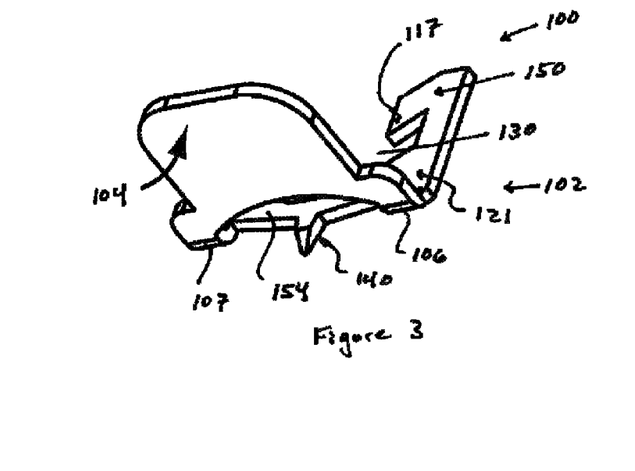
Figure 4:
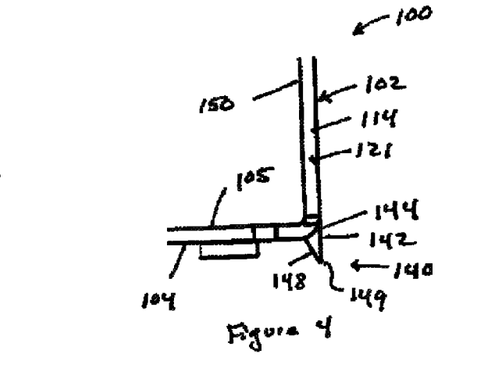
Figure 5:
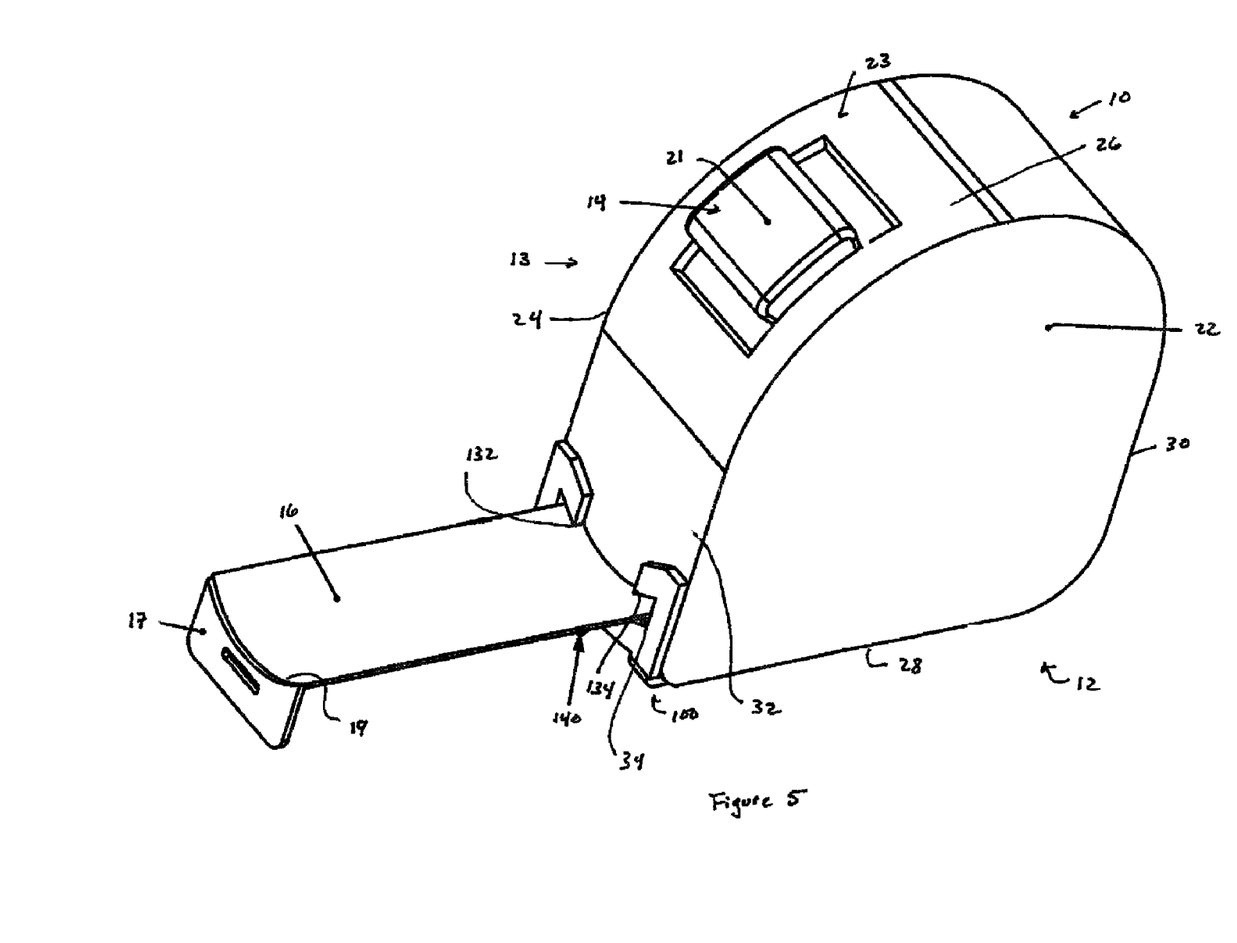
FIGS. 5-8 are schematics depicting various perspectives of an exemplary tape measure assembly comprising the measuring and marking device depicted in FIGS. 1-4.
Figure 6:
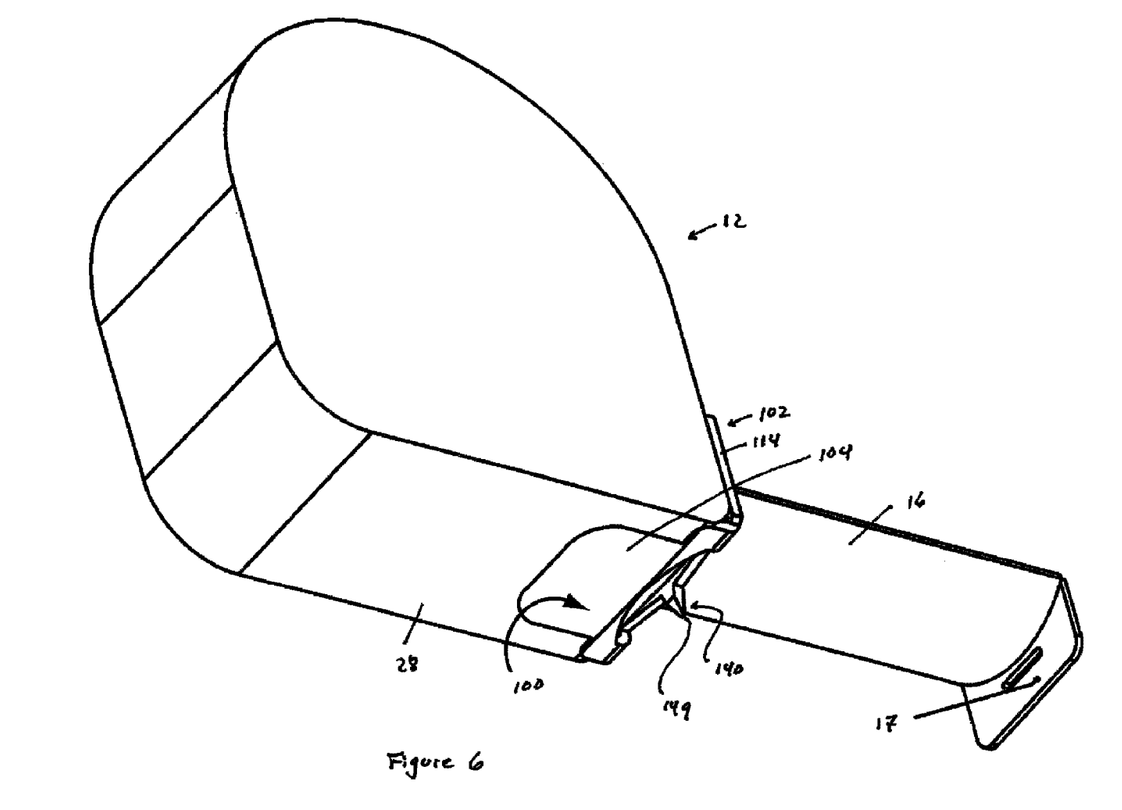
Figure 7:
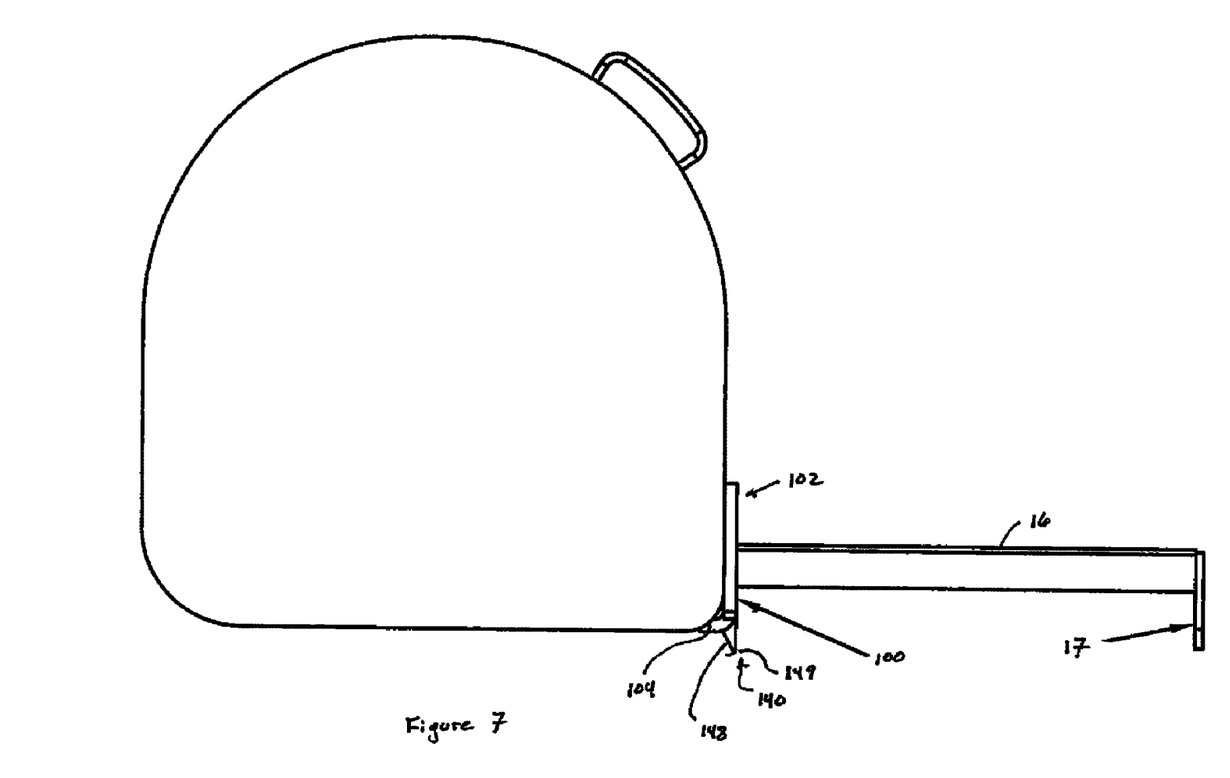
Figure 8:
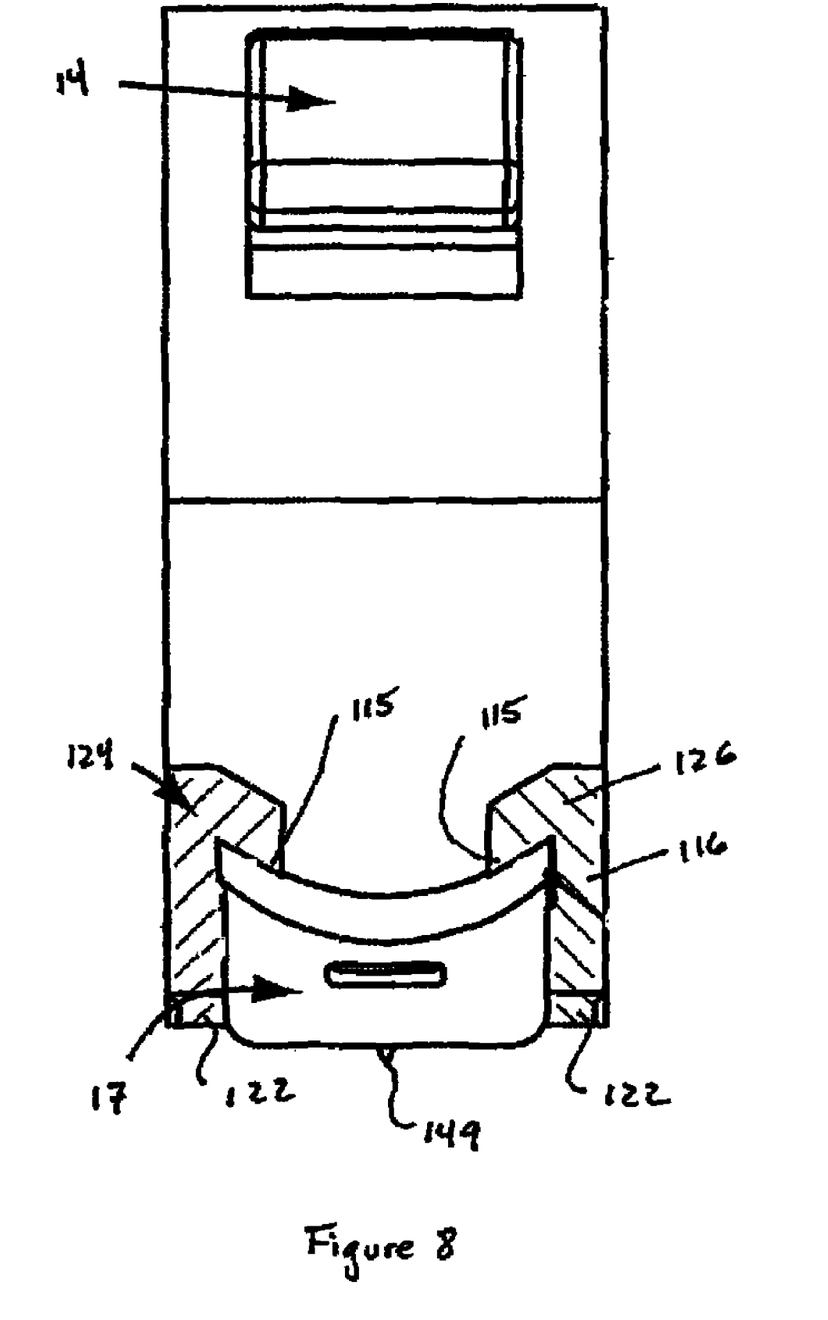
Figure 9:
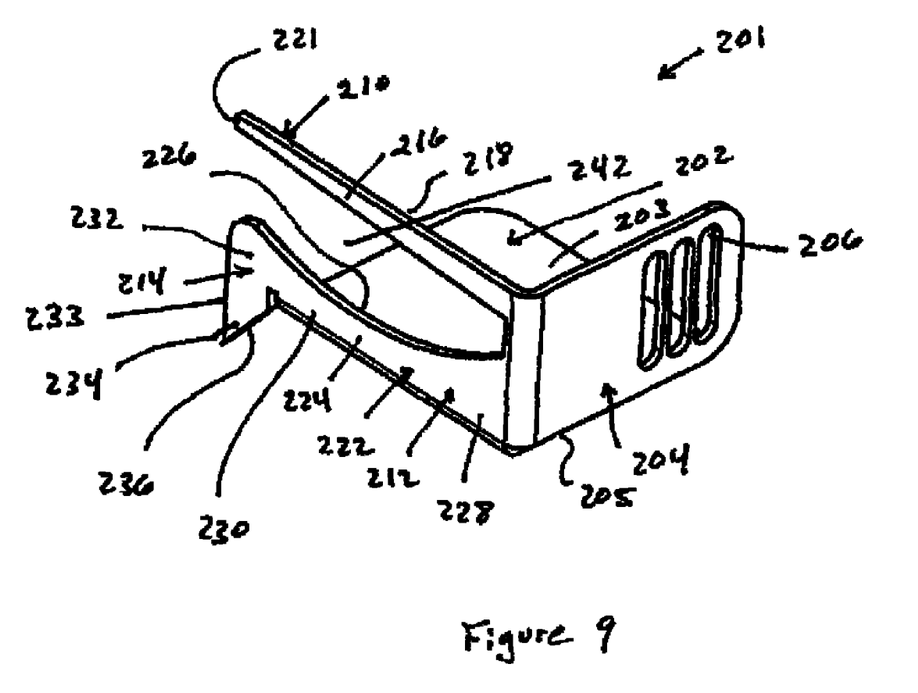
FIG. 9 is a schematic depicting an exemplary measuring and marking device.
Figure 10:
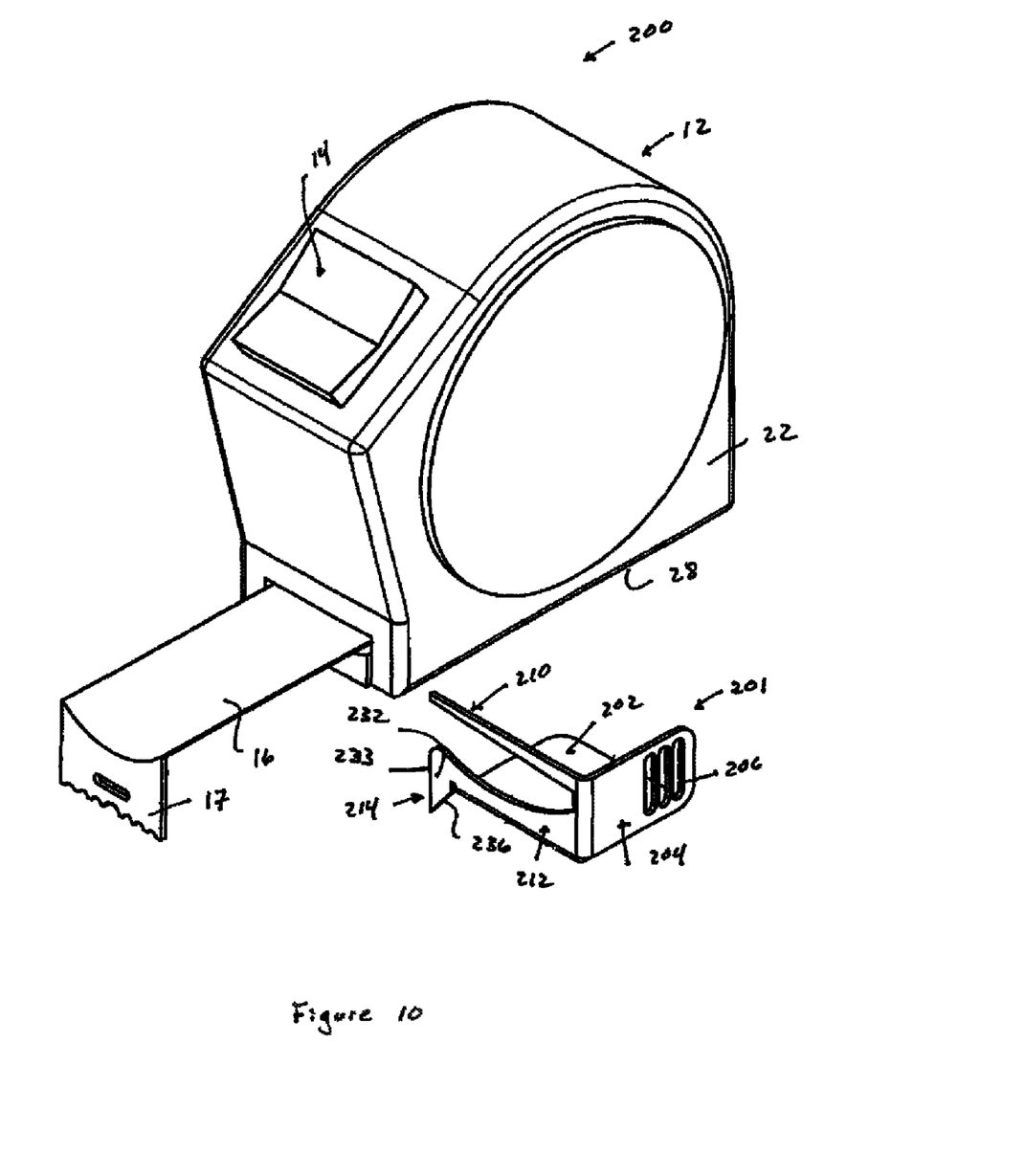
FIGS. 10-12 are schematics depicting various perspectives of an exemplary tape measure assembly comprising the measuring and marking device depicted in FIG. 9.
Figure 11:
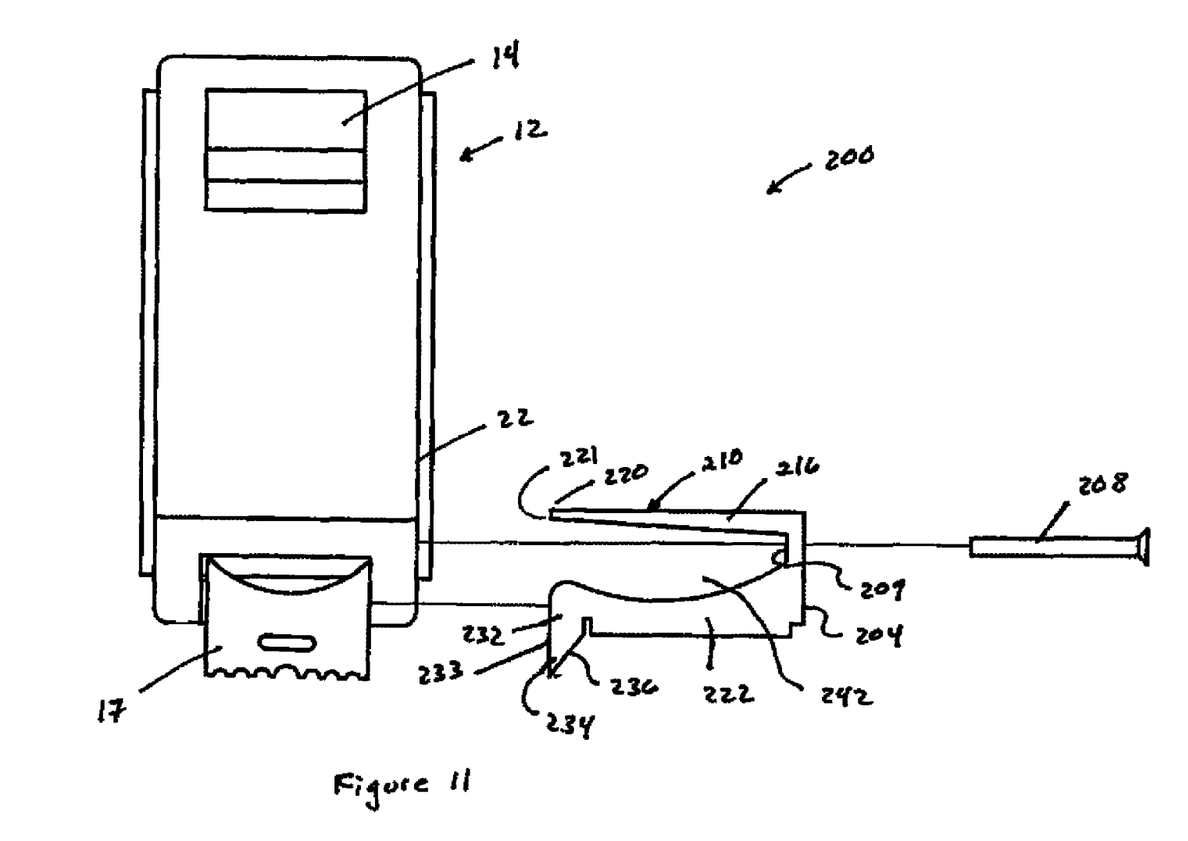
Figure 12:
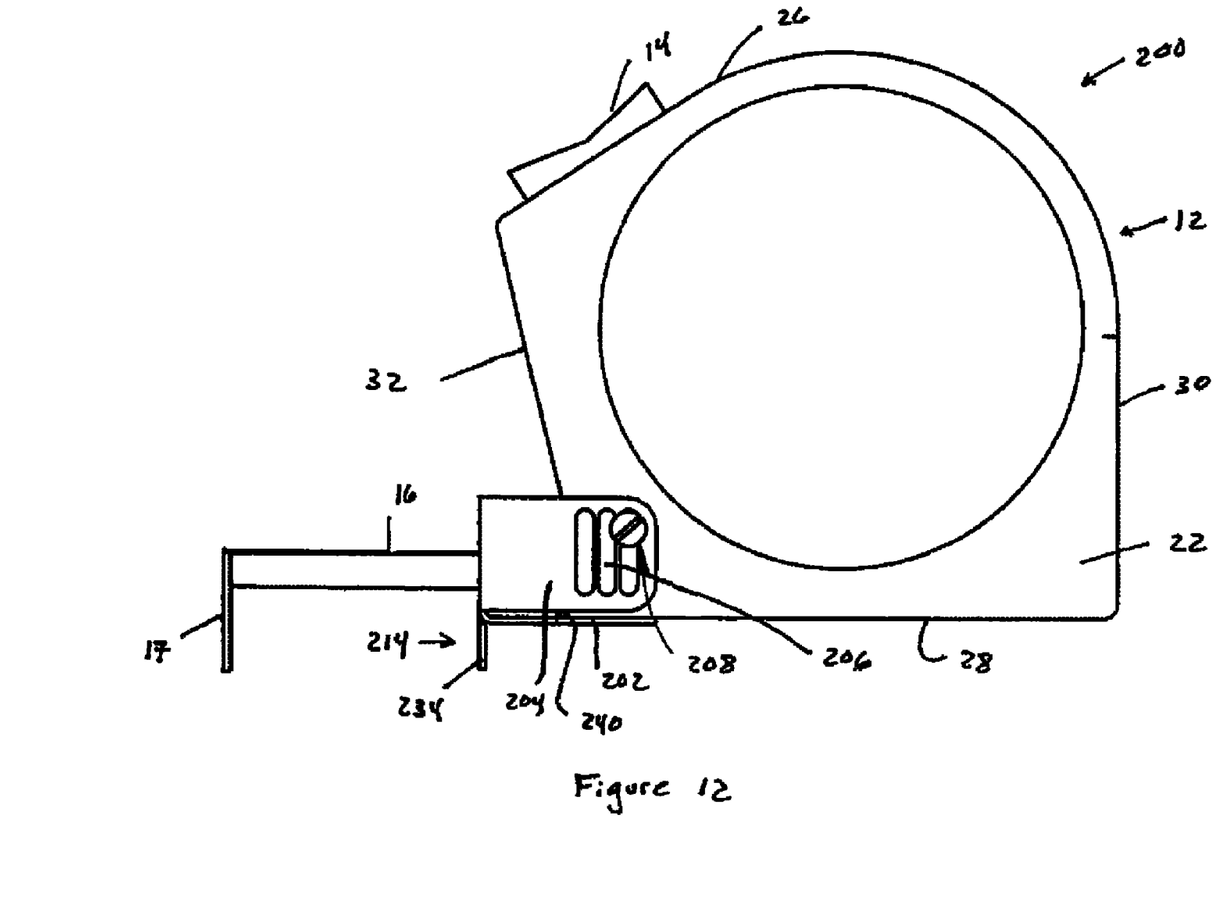

Another tape measure assembly 200 is depicted in FIGS. 10-12. Here, tape measure assembly 200 comprises tape measure 12 in combination with a measuring and marking device 201. Referring to FIGS. 9-12, measuring and marking device 201 comprises a lower bracket 202 positioned substantially perpendicular to a bottom edge 205 of a lateral bracket 204. Lateral bracket 204 comprises a plurality of slots 206 formed therethrough through which a screw 208 may be inserted to secure measuring and marking device 201 to side wall 22 side of tape measure 12. Additionally or alternatively, a double-sided adhesive (not shown) may be applied to a top side 203 of lower bracket 202 to thereby adhere lower bracket 202 to bottom wall 28 of tape measure 12.

Device 201 further comprises an indicator member 210, a stop member 212, and a scribe member 214. Indicator member 210 comprises a front side 216 opposite to a back side 218, and extends from a back side 209 of lateral bracket 204 at a substantially perpendicular angle therefrom, and terminates at a tip 220, wherein tip 220 comprises an anterior side wall 221 which is generally parallel to back side 209 of lateral bracket 204.

Stop member 212 comprises a bar 222 having a front side 224 opposite to a back side 226. A posterior end 228 of bar 222 is coterminous with and extends from back side 209 of lateral bracket 204 such that back side 226 is directed towards top side 203 of lower bracket 202.

Scribe member 214 comprises a wall 232 which is coterminous with an anterior end 230 of bar 222. Wall 232 is bordered by an outer wall 233 which extends below lower bracket 202 and which is coplanar with anterior side wall 221 of indicator member 210. Wall 232 is further bordered by an interior wall 236 which is joined to outer wall 233 at an acute angle and which extends upwardly therefrom towards lower bracket 202. Wall 232 comprises a tip 234 where outer wall 233 intersects interior wall 236.

Front side 216 of indicator member, front side 224 of bar 222, and tip 234 of scribe member 214 are coplanar thereby ensuring a precise read, recordation, and replication of measurement.

Measuring and marking device 201 may further comprise a spacer 240 disposed on top side 203 of lower bracket 202 to improve visibility of the measuring indicia on tape blade 16.

Additionally, an aperture 242 is formed between indicator member 210, stop member 212, and scribe member 214, such that, when measuring and marking device 201 is applied to tape measure 12, aperture 240 is aligned with tape blade aperture 34, thereby providing for a passageway for tape blade 16 to and from housing 13.

In an exemplary application of tape measure assembly 200, tab 17 of tape blade 16 is positioned on an edge of an object to be measured. Tape blade 16 is then extended from housing 13 and through apertures 34 and 242 until front side 224 of bar 222 abuts another edge of the object. With tape measure assembly 200 in this position, front side 224 of indicator member 210, which is coplanar with front side 224 of bar 222, is aligned with the measuring indicia on tape blade 16, wherein such measuring indicia precisely defines the length of the object.

Such precisely defined length may be replicated by drawing tape blade out from housing 13 until the previously obtained measuring indicia is aligned with front side 224 of indicator member 210. Tape blade 16 may then be locked in position using locking mechanism 14. The object may be marked and/or scored at this precisely measured length by placing locked tape measure assembly 200 against an object, and then by applying pressure against housing 13 while moving housing 13 in a side-to-side fashion such that tip 234 of scribe member 214 marks and/or scores the object.

Accordingly, as is readily apparent from a reading of the present disclosure, the measuring and marking device of the present invention is designed to function as a mounted accessory to a standard tape measure. Once attached in position on the tape measure, all the parts and elements function as one unitary device. The device provides the user with a hand-held instrument for precise and easy sighting, locking, recording, transferring and marking of measurements. Persons who cannot readily take, read or remember measurements, due to impaired vision or visibility, poor lighting or awkward positioning can easily use the invention to achieve precise and reliable results.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

While there is shown and described certain preferred embodiments of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A measuring and marking device for use in the precise taking, reading, replicating, and marking of a measurement with a tape measure, wherein the device comprises:
    a frame comprising:
        a stop member comprising a horizontally extending bar having a front side opposite to a bottom side;
        a scribe member comprising a front wall which extends from the front side of the bar, and which terminates at a point oppositely situated from the bar;
        an anterior flange oppositely situated from a posterior flange, wherein each of the anterior and posterior flanges vertically extend from the front side of the bar; and
        a first indicator member which extends from the anterior lateral flange and a second indicator member which extends from the posterior lateral flange, wherein each of the first and second indicator members slope downwardly from the respective anterior and posterior lateral flanges and towards each other to each terminate at a respective tip, each tip having a front side opposite to a back side;
    wherein the front side of the bar, the front sides of the tips of the first and second indicator members, and the point of the scribe member are coplanar; and further wherein, when the device is positioned on the tape measure, the tips of the first and second indicator members overly and are aligned with measuring indicia on a tape blade of the tape measure when the tape blade is extended from a housing of the tape measure.

2. The measuring and marking device of claim 1, further comprising an aperture which is bordered by the bar of the stop member, the anterior and posterior lateral flanges, and the first and second indicator members, wherein the aperture is aligned with the tape blade aperture.

3. The measuring and marking device of claim 1, wherein the measuring and marking device further comprises a lower bracket disposed substantially perpendicular to the frame, wherein the lower bracket is received and disposed on a bottom wall of the housing of the tape measure.

4. The tape measure assembly of claim 3, wherein the point of the scribe member extends below the lower bracket.

5. The tape measure assembly of claim 4, wherein the point of the scribe member is centrally aligned with the front side of the bar.

6. A tape measure assembly, comprising:
    a tape measure comprising:
        a side wall adjacent to a front wall and to a bottom wall, wherein the front wall comprises a tape blade aperture formed therethrough; and
        a tape blade having measuring indicia detectable thereon; and
    a measuring and marking device, comprising a frame, wherein the frame comprises:
        a stop member comprising a horizontally extending bar having a front side opposite to a back side and an anterior end opposite to a posterior end;
        a scribe member comprising a first wall which extends from the front side of the bar and which terminates at a point;
        an anterior lateral flange which extends vertically from the anterior end of the bar, and a posterior lateral flange which extends vertically from the posterior end of the bar; and
        a first indicator member which extends from the anterior lateral flange, and a second indicator member which extends from the posterior lateral flange, wherein each of the first and second indicator members slope downwardly from the respective anterior and posterior lateral flanges and towards each other to each terminate at a respective tip, each tip having a front side opposite to a back side, wherein each of the front sides of the tips overly and are aligned with the measuring indicia of the tape blade when the tape blade is extended through the tape blade aperture;
    wherein the front side of the bar, the front sides of the tips of the first and second indicator members, and the point of the scribe member are coplanar.

7. The tape measure assembly of claim 6, wherein the measuring and marking device further comprises an aperture which is bordered by the bar of the stop member, the anterior and posterior lateral flanges, and the first and second indicator members, wherein the aperture is aligned with the tape blade aperture.

8. The tape measure assembly of claim 6, wherein the measuring and marking device further comprises a lower bracket disposed substantially perpendicular to the frame, wherein the lower bracket is received by the bottom wall of the tape measure.

9. The tape measure assembly of claim 8, wherein the point of the scribe member extends below the lower bracket.

10. The tape measure assembly of claim 9, wherein the point of the scribe member is centrally aligned with the front side of the bar.

* * * * *